United States Patent [19]

Herbst et al.

[11] Patent Number: 4,752,375

[45] Date of Patent: Jun. 21, 1988

[54] SINGLE RISER FLUIDIZED CATALYTIC CRACKING PROCESS UTILIZING A C3-4 PARAFFIN-RICH CO-FEED AND MIXED CATALYST SYSTEM

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 903,185

[22] Filed: Sep. 3, 1986

[51] Int. Cl.$^4$ .............................................. C01G 51/04
[52] U.S. Cl. ....................................... 208/74; 208/72; 208/89; 585/322; 585/330
[58] Field of Search ................... 208/72, 74, 70, 120, 208/120 MC, 89; 585/322, 330

[56] References Cited

U.S. PATENT DOCUMENTS

| | | | |
|---|---|---|---|
| 3,617,497 | 11/1971 | Bryson et al. | 208/80 |
| 3,748,251 | 7/1973 | Demmel et al. | 208/74 |
| 3,847,793 | 11/1974 | Schwartz et al. | 208/164 |
| 3,849,291 | 11/1974 | Owen | 208/78 |
| 3,894,931 | 7/1975 | Nace et al. | 208/73 |
| 3,894,932 | 7/1975 | Owen | 208/74 |
| 3,894,933 | 7/1975 | Owen et al. | 208/77 |
| 3,894,934 | 7/1975 | Owen et al. | 208/78 |
| 3,894,935 | 7/1975 | Owen | 208/78 |
| 3,926,778 | 12/1975 | Owen et al. | 208/74 |
| 3,928,172 | 12/1975 | Davis, Jr. et al. | 208/77 |
| 3,974,062 | 8/1976 | Owen et al. | 208/74 |
| 4,116,814 | 9/1978 | Zahner | 208/78 |
| 4,287,088 | 9/1981 | Sirkar | 208/520 CT |
| 4,289,606 | 9/1981 | Gladrow et al. | 208/120 MC |
| 4,294,688 | 10/1981 | Mayer | 208/164 |
| 4,309,279 | 1/1982 | Chester et al. | 208/120 |
| 4,368,114 | 1/1983 | Chester et al. | 208/120 |
| 4,422,925 | 12/1983 | Williams et al. | 208/75 |
| 4,490,241 | 12/1984 | Chou | 208/120 |

FOREIGN PATENT DOCUMENTS

| | | | |
|---|---|---|---|
| 0074501 | 3/1983 | European Pat. Off. | 208/120 |
| 0101553 | 2/1984 | European Pat. Off. | 208/120 |
| 0171460 | 2/1986 | European Pat. Off. | 208/120 |
| 2298595 | 1/1975 | France | 208/120 |

*Primary Examiner*—Helen M. S. Sneed
*Assistant Examiner*—Anthony McFarlane
*Attorney, Agent, or Firm*—Alexander J. McKillop; Michael G. Gilman; Marina V. Schneller

[57] ABSTRACT

There is provided a catalytic cracking operation featuring a single riser reaction zone having a lower and an upper section wherein a variety of hydrocarbon conversion reactions takes place, a stripping zone in which entrained hydrocarbon material is removed from catalyst and a regeneration zone in which spent cracking catalyst is regenerated, which comprises:

(a) cracking a $C_{3-4}$ paraffin-rich feed in the lower section of the riser reaction zone in the presence of the second component of a mixed catalyst system, the second component being zeolite Beta and/or a shape selective medium pore crystalline silicate zeolite, to provide light olefins and conversion products of light olefins including aromatics and hydrogen; and, (b) cracking a heavy hydrocarbon feed in an upper section of the riser reaction zone in the presence of the first component of the mixed catalyst system, the first component being an amorphous cracking catalyst and/or a large pore crystalline cracking catalyst, to provide gasoline boiling range components, there being a sufficient difference between one or more physical characteristics of the catalyst components as to permit particles of second catalyst component to remain in the lower section of the riser reaction zone for a longer average period of time than particles of first catalyst component and, optionally, to permit particles of first catalyst component to be separated from particles of second catalyst component in the stripping zone.

24 Claims, 2 Drawing Sheets

SINGLE RISER FLUIDIZED CATALYTIC CRACKING PROCESS UTILIZING A C3-4 PARAFFIN-RICH CO-FEED AND MIXED CATALYST SYSTEM

BACKGROUND OF THE INVENTION

This invention relates to a single riser catalytic cracking operation utilizing a $C_{3-4}$ paraffin-rich co-feed as a source of light olefins for subsequent conversion to gasoline boiling range components and further features the use of a mixed catalyst system comprising, as a first component, an amorphous cracking catalyst and/or a large pore crystalline cracking catalyst, e.g., zeolite Y, and, as a second component, zeolite Beta and/or a shape selective medium pore crystalline silicate zeolite catalyst, e.g., zeolite ZSM-5.

In known and conventional fluidized catalytic cracking processes, a relatively heavy hydrocarbon feedstock, e.g., a gas oil, admixed with a suitable cracking catalyst, e.g., a large pore crystalline silicate zeolite such as zeolite Y, to provide a fluidized suspension is cracked in an elongated reactor, or riser, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,932, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers).

U.S. Pat. No. 3,894,932 describes a single riser fluid catalytic cracking operation in which a gas oil and a $C_3$-$C_4$ rich gaseous material is converted to aromatics and isobutane in the presence of a faujasite-type zeolite, e.g., zeolite Y.

U.S. Pat. No. 3,894,935 describes a dual riser fluid catalytic cracking process in which a gas oil is catalytically cracked in a first riser in the presence of a faujasite-type zeolite such as zeolite Y to provide gasoline boiling-range material and a $C_3$-$C_4$ rich hydrocarbon fraction or isobutylene is converted in a second riser in the presence of hot regenerated catalyst or catalyst cascaded thereto from the first riser to provide aromatics, alkyl aromatics and low boiling gaseous material.

Several of the processes referred to above employ a mixed catalyst system with each component of the system possessing different catalytic properties and functions. For example, in the dual riser hydrocarbon conversion process described in U.S. Pat. No. 3,894,934, a heavy hydrocarbon first feed, e.g., a gas oil, is cracked principally as a result of contact with a large pore crystalline silicate zeolite cracking catalyst, e.g., zeolite Y, to provide lighter products. Spent catalyst is separated from the product stream and enters the dense fluid catalyst bed in the lower section of the stripping vessel. A $C_{3-4}$ olefin-rich second feed, meanwhile, undergoes conversion to cyclic and/or alkylaromatic hydrocarbons in a second riser, principally as a result of contact with a shape selective medium pore crystalline silicate zeolite, e.g., zeolite ZSM-5. Spent catalyst recovered from the product stream of the second riser similarly enters the dense catalyst bed within the stripper vessel. U.S. Pat. No. 3,894,934 also features the optional introduction of a $C_3$-containing hydrocarbon third feed along with an aromatic-rich charge into the dense fluid bed of spent catalyst above the level of introduction of the stripping gas to promote the formation of alkyl aromatics therein. As desired, the third feed may be light gases obtained from a fluid cracking light ends recovery unit, virgin straight run naphtha, catalytically cracked naphtha, thermal naphtha, natural gas constituents, natural gasoline, reformates, a gas oil, or a residual oil of high coke-producing characteristics.

In this and other fluidized catalytic cracking operations employing mixtures of large and medium pore size crystalline silicate zeolite catalysts where catalyst separated from the product effluent is conveyed to a stripper and from there to a catalyst regenerating zone, regardless of the nature of the catalyst introduction at start-up, once steady-state operation has been achieved, the two types of catalyst will become fairly uniformly mixed and will circulate throughout the system at or about the same rate. This arrangement is subject to a significant disadvantage. While the large pore zeolite cracking catalyst cokes up relatively quickly and must therefore be regenerated at frequent intervals, this is not the case with the medium pore zeolites which can maintain their catalytic activity over many more cycles of operation. However, since the large and medium pore zeolites are in intimate admixture, heretofore there has been no practical means of conveying only the large pore zeolite to the catalyst regenerator unit or, what amounts to the same thing, keeping the medium pore zeolite, or at least most of it, on the average out of the regenerator.

Thus, a principal disadvantage resulting from the use of mixed catalyst systems in known fluidized catalytic cracking operations is owing to the fact that the medium pore zeolite component is subjected to the harsh hydrothermal conditions of the catalyst regenerator unit even though it does not require regeneration anywhere near the rate at which the large pore zeolite cracking component must be regenerated. The medium pore zeolite is therefore needlessly subjected to hydrothermal deactivation at a much greater rate than is necessary for it to function.

U.S. Pat. No. 4,116,814 describes a multiple riser fluidized catalytic cracking operation utilizing a mixture of large and medium pore crystalline zeolite catalysts which differ in particle size and/or density as to facilitate their separation in a common catalyst regeneration unit. There is, however, no hint in this patent of preventing the transfer or reducing the rate of circulation of medium pore crystalline zeolite to and through the catalyst regeneration unit.

U.S. Pat. No. 4,287,088 describes a process and system for the segregation of used contaminated catalyst into fractions according to particle density differences. No mention is made of mixed catalyst systems.

SUMMARY OF THE INVENTION

It is an object of the invention to provide a single riser fluid catalytic cracking process in which a $C_{3-4}$ paraffin-rich feed is cracked in a lower section of the riser in the presence of the second component of a mixed catalyst system, the second component being zeolite Beta and/or a shape selective medium pore crystalline silicate zeolite such as ZSM-5, to provide light olefins which undergo conversion to other products, and a heavy hydrocarbon feed, e.g., gas oil and/or resid, is cracked in an upper section of the riser in the presence of both the first and the second component of the mixed catalyst system, the first component being an amorphous cracking catalsyt and/or a large pore crystalline cracking catalyst, and the second component being zeolite Beta and/or a shape selective medium pore crystalline silicate zeolite such as ZSM-5 to provide a relatively high octane gasoline product.

It is a particular object of the present invention to carry out the foregoing process wherein one or more differences in the physical characteristics of the first and second catalyst components, i.e., average particle size, density and shape, are such that the second catalyst component will have a higher settling rate than the first catalyst component as a result of which the second catalyst component will have a longer residency time in the lower section of the riser than the first catalyst component or, stated another way, the second catalyst component will circulate through the riser at a slower rate than the first catalyst component.

It is still another object of the invention to separate the first and second catalyst components in the stripping zone of the cracking unit such that stripped, spent first catalyst component can be conveyed to the regenerator zone while the stripped second catalyst component (which retains significant catalytic activity) can be conveyed directed to the lower section of the riser thereby bypassing the regenerator zone.

Yet another object of the invention consists in hydrotreating the heavy hydrocarbon feed prior to its introduction to the riser utilizing hydrogen recovered from the process.

In keeping with the foregoing objects, there is provided a catalytic cracking operation featuring a single riser reaction zone having a lower and an upper section wherein a variety of hydrocarbon conversion reactions takes place, a stripping zone in which entrained hydrocarbon material is removed from catalyst and a regeneration zone in which spent cracking catalyst is regenerated, which comprises:

(a) cracking a $C_3$-$C_4$ paraffin-rich feed in the lower section of the riser reaction zone in the presence of the second component of a mixed catalyst system, the second component being zeolite Beta and/or a shape selective medium pore crystalline silicate zeolite, to provide light olefins and conversion products of light olefins including aromatics and hydrogen; and, (b) cracking a heavy hydrocarbon feed in an upper section of the riser reaction zone in the presence of the first component of the mixed catalyst system, the first component being an amorphous cracking catalyst and/or a large pore crystalline cracking catalyst, to provide gasoline boiling range components, there being a sufficient difference between one or more physical characteristics of the catalyst components as to permit particles of second catalyst component to remain in the lower section of the riser reaction zone for a longer average period of time than particles of first catalyst component and, optionally, to permit particles of first catalyst component to be separated from particles of second catalyst component in the stripping zone;

The term "catalyst" as used herein shall be understood to apply not only to a catalytically active material but to one which is composited with a suitable matrix component which may or may not itself be catalytically active.

The foregoing process possesses several significant advantages over known catalytic cracking operations. Thus, the cracking of the $C_3$-$C_4$ paraffin-rich feed in the lower section of the riser provides light olefins which subsequently undergo reactions characteristic of zeolite Beta and/or the shape selective medium pore crystalline silicate zeolite present therein, e.g., aromatization, alkylation, isomerization, oligomerization, disproportionation, etc., to provide components which contribute to an increase in the RON and MON of the gasoline product resulting from the cracking of heavy hydrocarbon feed further up the riser. The rapidly expanding catalyst-hydrocarbon suspension also acts as a lift medium for the suspension of catalyst and heavy hydrocarbon feed which is formed in the upper section of the riser.

In addition, the use of the foregoing mixed catalyst system does much to overcome a major drawback of known and conventional mixed catalyst systems in which both catalyst components circulate through the hydrothermal catalyst regeneration zone at about the same rate. As applied, for example, to a fluidized catalytic cracking process in which a cracking catalyst requiring frequent regeneration such as zeolite Y is employed in combination with zeolite Beta and/or a shape selective medium pore crystalline silicate zeolite catalyst requiring comparatively infrequent regeneration such as ZSM-5, the present invention makes it possible to sustain the initial levels of activity of the latter catalyst for much longer average periods than would otherwise be the case due to the reduced incidence of its exposure to the catalyst-degrading environment of the regenerator zone. This, in turn, permits the refiner to take greater advantage of the unique catalytic capabilities of zeolite Beta and/or ZSM-5 in a catalytic cracking operation.

DESCRIPTION OF THE PREFERRED EMBODIMENTS

Conventional cracking catalyst components are generally amorphous silica-alumina and crystalline silica-alumina. Other materials said to be useful as cracking catalysts are the crystalline silicoaluminophos- phates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon- substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline cracking catalysts as the first catalyst component of the mixed catalyst system. Preferred crystalline zeolite components of the mixed catalyst system herein include the natural zeolites mordenite and faujasite and the synthetic zeolites X and Y with particular preference being accorded zeolites Y, REY, USY and RE-USY.

The shape selective medium pore crystalline silicate zeolite catalyst constituting the second catalyst component of the mixed catalyst system is exemplified by ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Pat. No. Re. 29,948 describing and claiming a crystalline material with an X-ray diffraction pattern of ZSM-5 is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12, is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245 the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,573, the entire contents of which are incorporated herein by reference.

The preferred shape selective medium pore crystalline silicate zeolite components of the mixed catalyst system herein are ZSM-5, ZSM-11 ZSM-12, ZSM-23, ZSM-35, ZSM-38 and ZSM-48 with ZSM-5 being particularly preferred.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, zirconium, titanium and any other trivalent metal which is heavier than aluminum. Specific examples of such catalysts include ZSM-5 and zeolite Beta containing boron, gallium, zirconium and/or titanium. In lieu of, or in addition to, being incorporated into the zeolite framework, these and other catalytically active elements can also be deposited upon the zeolite by any suitable procedure, e.g., impregnation. It is also within the scope of this invention to employ a mixed catalyst system in which the first component is a large pore zeolite cracking catalyst such as zeolite Y and the second component is zeolite Beta and/or a shape selective medium pore crystalline silicate such as ZSM-5, advantageously one containing boron, gallium, zirconium and/or titanium as part of its framework structure and/or deposited thereon.

As stated above, it is an object of the present invention to prolong the residency time of particles of second catalyst component in the lower section of the riser reaction zone relative to that of particles of first catalyst component therein by imparting one or more different physical characteristics to the particles of each catalyst component such that the second catalyst component will, on the average, have a higher settling rate than the first catalyst component.

Residency time of catalyst particles in a riser is primarily dependent on two factors: the linear velocity of the fluid stream within the riser which tends to carry the entire catalyst bed/conversion products/unconverted feed up and out of the riser into the separator unit and the opposing force of gravity which tends to keep the slower moving catalyst particles within the riser. Ordinarily, in a mixed catalyst system, both catalyst components will circulate through the system at about the same rate. As previously pointed out, this has proven disadvantageous to the efficiency of the system since the medium pore zeolite or other catalyst component which does not require as frequent regeneration as the cracking catalyst will be needlessly subjected to the catalyst-degrading conditions of the regenerator with the result that its useful catalytic life will be shortened. However, in accordance with this invention, it is possible to retain the less coke deactivated catalyst (second component) within the riser, even to the point where, because of a balance between the upward velocity of this catalyst component and its settling rate, it can be made to remain more or less stationary, within the lower section of the riser defining a zone of concentration therein. To bring about this balance or to otherwise prolong the residency time of the second component of the mixed catalyst system within the riser, the average density, particle size and/or shape of the catalyst particles can be adjusted in a number of ways as to provide the desired settling characteristics. As a general guide, as the average particle size of the catalyst increases and/or its average particle density increases, the residency time of the catalyst will increase.

Figure 1:
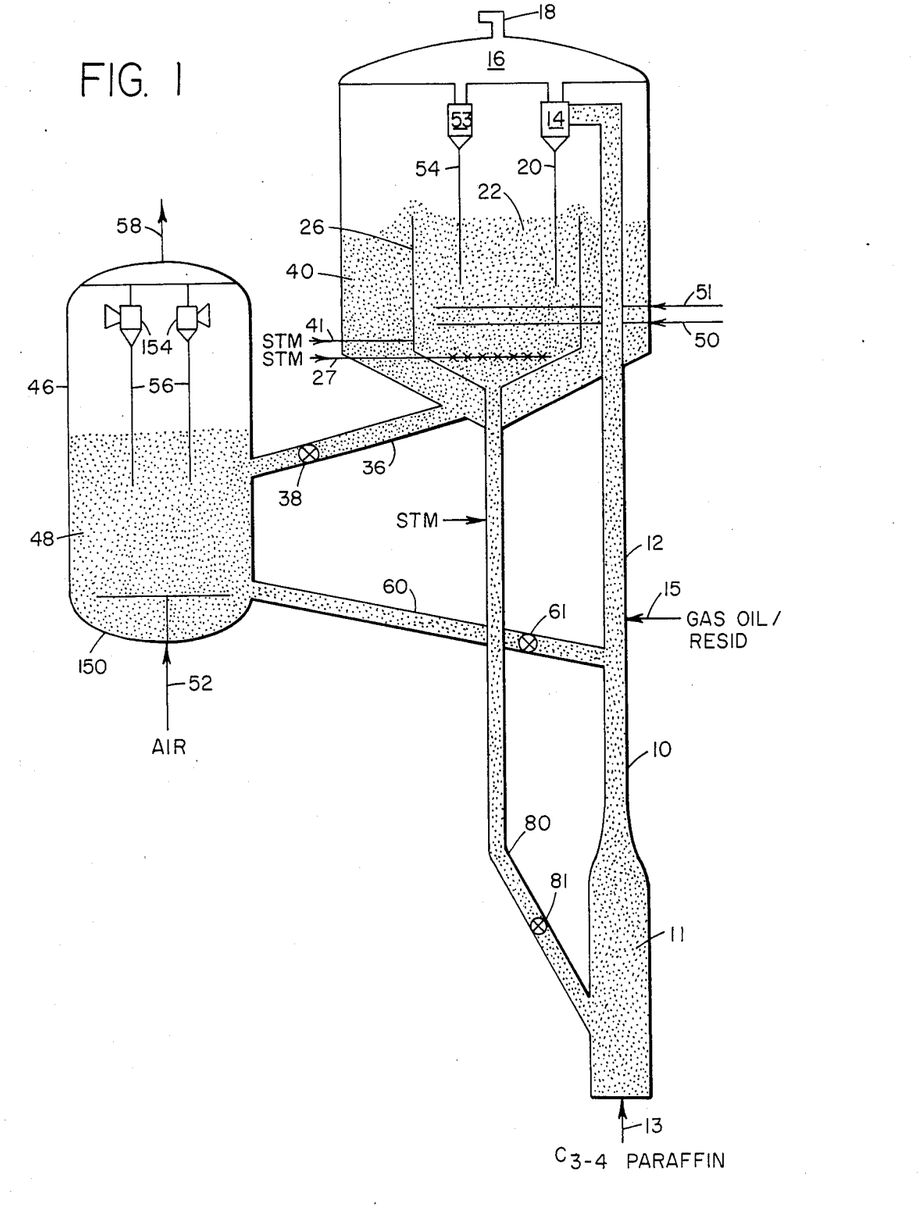
FIGS. 1 and 2 schematically illustrate preferred embodiments of a single riser fluidized catalytic cracking process in accordance with this invention, i.e., one in which the second catalyst component defines a zone of concentration in an expanded, lower section of the riser reaction zone and the stripping zone features means for separating the first and second catalyst components based primarily on differences in their average particle sizes and densities, such arrangement making it possible to cycle the second catalyst component without exposing it to the catalyst-degrading conditions of the regenerator zone.
Figure 2:
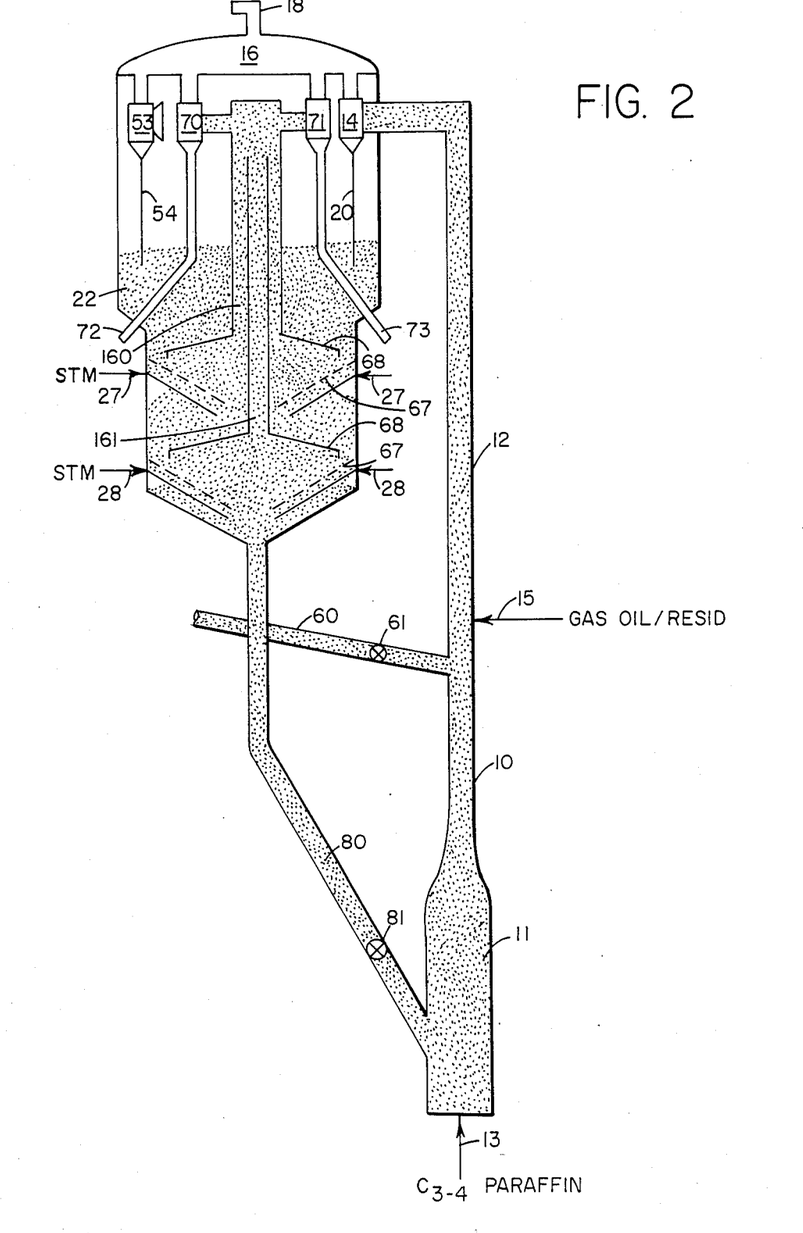

Assuming, for example, this differential in settling rates is accomplished by making the particles of the second catalyst component initially larger and of greater density than the particles of first catalyst component and perhaps even more irregular in shape than the latter, gradual attrition of the larger particles (through particle collision) will progressively reduce their capability for prolonged residency in the riser and as time goes on, increasing quantities of such particles will enter the stripping zone where, however, they can still be readily separated based on their different densities as more fully explained below in connection with the embodiments shown in FIGS. 1 and 2. This arrangement, i.e., increased residency time of particles of second catalyst component in the lower section of the riser coupled with separation of such particles from particles of first catalyst component in the stripping zone, maximizes the capability of the catalytic cracking process of this invention for reducing the rate of circulation of the less coke deactivated second component catalyst particles through the regenerator zone.

Among the techniques which can be used for making one catalyst component more dense than the other is compositing each catalyst with a matrix component of substantially different density. Useful matrix components include the following:

| matrix component | particle density (gm/cm$^3$) |
|---|---|
| alumina | 3.9–4.0 |
| silica | 2.2–2.6 |
| magnesia | 3.6 |
| beryllia | 3.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator, i.e., the second catalyst component, will be more dense than the catalyst requiring frequent regeneration, i.e., the first catalyst component. For example, in the case of a mixed catalyst system containing medium pore and large pore crystalline silicate zeolites where it is desired to increase the residency time of the medium pore zeolite in the lower section of the riser, the overall packed density of the medium pore zeolite particles inclusive of its matrix component can advantageously vary from about 0.6 to about 4.0 gm/cm$^3$, and preferably from about 2.0 to about 3.0 gm/cm$^3$, and the overall packed density of the large pore zeolite particles inclusive of its matrix component can advantageously vary from about 0.4 to about 1.1 gm/cm$^3$ density, and preferably from about 0.6 to about 1.0 gm/cm$^3$.

Another useful technique for adjusting the density of each catalyst component, again in the case of a mixture of medium and large pore zeolites, is to composite the medium pore zeolite particles with a material which tends to coke up faster than the particles of large pore zeolite, such resulting in an increase in the density of the former in situ. Illustrative of such materials is hydrated alumina which in situ forms a transition alumina which has a faster coking rate than, for example, zeolite Y. This embodiment possesses several additional advantages. In the coked-up state, the composited medium pore silicate zeolite is more resistant to attrition which results from collision with other particles in the riser. The individual catalyst particles can sustain more collisions and thus serve as a practical means of adjusting the velocity of the large pore zeolite particles through the riser (the latter in colliding with the medium pore zeolite particles will, as a result, have reduced velocity). In addition, the coked-up composited medium pore zeolite particles will tend to accumulate metals present in the feed.

As previously stated, the relative settling rate of each catalyst component can be selected by varying the average particle size of the catalyst particles. This can be readily accomplished at the time of compositing the catalyst particles with various matrix components. As between two catalyst components of significantly different average particle size, the larger will tend to remain within the riser longer than the smaller. Where, as here, it is desired to increase the residency time of the medium pore zeolite particles in the lower section of the riser over that of the large pore catalyst component, the average particle size of the former will usually be larger than that of the latter. So, for example, the average particle size of the medium pore zeolite particles can be made to vary from about 500 microns to about 70,000 microns, and preferably from about 100 to about 25,000 microns while the average particle size of the large pore zeolite particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the longer the residency time of the particles in the riser. Irregular-shaped particles can be simply and readily achieved by crushing the catalyst-matrix extrudate or using an extruded catalyst.

As will be appreciated by those skilled in the art, the settling rate for a particular catalyst component will result from the interaction of each of the three foregoing factors, i.e., density, average particle size and particle shape. The factors can be combined in such a way that they each contribute to the desired result. For example, the particles of the second catalyst component can simultaneously be made denser, larger and more irregular in shape than the first catalyst particles which require frequent regeneration. However, a differential settling rate can still be provided even if one of the foregoing factors partially offsets another as would be the case where greater density and smaller average particle size coexist in the same catalyst particle. Regardless of how these factors of particle density, size and shape are established for a particular catalyst component, their combined effect will, of course, be such as to result in a significant differential in settling rates of the components comprising the mixed catalyst system of this invention, the particles of second catalyst component having on average the higher of the settling rates.

By expanding, or flaring, the cross sectional geometry of the lower section of the riser, it is possible to further prolong the residency time therein of the denser, larger and/or more irregularly shaped second catalyst particles which will define a zone of concentration therein.

Separation of particles of first catalyst component from particles of second catalyst component in the stripping zone in accordance with a preferred embodiment of the catalytic cracking process herein can be accomplished in several ways. For example, the two components can be provided in such different average particle sizes that they can be readily sorted within a stripping zone provided with suitable sieving means. Separation within the stripping zone can also be achieved by classifying the first and second catalyst component according to their average particle densities which can be made to be significantly different in various ways including by appropriate selection of the matrix components with which they are composited as explained above. In general, smaller, less dense catalyst particles will tend on the average to define an upper phase within the stripper floating upon larger, more dense catalyst particles which, conversely, will tend on the average to define a lower phase within the stripper.

Where separation of catalyst particles is based largely on differences in density, several techniques can be used to effect their separation, such being described more fully, infra, in connection with the stripping unit embodiments shown in FIGS. 1 and 2.

The zeolite Beta and/or shape selective medium pore crystalline silicate zeolite catalyst, namely, the second catalyst component, can be present in the mixed catalyst system over widely varying levels. For example, the zeolite in this catalyst can be present at a level as low as about 0.01 to about 1.0 weight percent of the total catalyst inventory (as in the case of the catalytic cracking process of U.S. Pat. No. 4,368,114 utilizing ZSM-5) and can represent as much as 25 weight percent of the total catalyst system.

The $C_3$-$C_4$ paraffin-rich feed can be provided from any suitable source, e.g., the product of a high temperature catalytic cracking operation, petroleum fractionation, natural gas, etc.

Suitable charge stocks for cracking in the upper section of the riser comprise the heavy hydrocarbons generally and, in particular, petroleum fractions having an initial boiling point range of at least 400° F., a 50% point range of at least 500° F. and an end point range of at least 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking.

FIGS. 1 and 2 each describes the stripping section of a single riser fluidized cracking unit provided with means for separating particles of ZSM-5 catalyst from particles of zeolite Y catalyst based primarily upon the difference in the densities of these two types of catalyst components. The riser component of the fluidized cracking units shown in FIGS. 1 and 2 is of a preferred type, i.e., its cross-sectional geometry has been modified in the lower section thereof so as to alter the linear velocity of the fluid stream in this section. The purpose of this feature is to further prolong the residency time of the ZSM-5 catalyst particles, which are both larger and of greater density than the zeolite Y particles, in the lower section of the riser. Thus, the ZSM-5 particles occupying this section possess a combination of density, average particle size and perhaps even shape such that the linear velocity of the suspension in this region which would tend to carry the ZSM-5 particles up and out of riser is in approximate balance with the settling rate of these particles. Such being the case, the ZSM-5 particles, or at least the bulk of them, remain more or less stationary, or suspended, in lower section 11 of riser 10 where they selectively crack the $C_{3-4}$ paraffin-rich feed to light olefins and catalyze a variety of conversions involving the light olefins present in this section including oligomerization, alkylation, isomerization, aromatization, etc., the result of which, as previously indicated, is to contribute to the production of a gasoline product of increased RON and MON. Spent particles of zeolite Y catalyst, being less dense, smaller and/or more regular in shape than the ZSM-5 particles, continue past lower section 11 and, together with the conversion products from said lower section and some amount of ZSM-5 particles, enter upper section 12 of the riser where they are combined with hot, freshly regenerated zeolite Y and a gas oil/resid feed. The gasiform products of all of the conversion reactions occurring in riser 10 are ultimately discharged from the top of the riser into one or more cyclonic separation zones adjacent the riser discharge as represented by cyclone separator 14 provided with dipleg 20.

Although as indicated earlier, the ZSM-5 particles have an initially greater average particle size and density than that of the zeolite Y particles and therefore can be made to form a zone of concentration in flared lower section 11 of riser 10, eventually they will become reduced in size due to the inevitable particle collisions which constantly take place in the system. As time goes on, more and more of the ZSM-5 particles will be discharged from riser 10 to enter catalyst bed 22 where, however, their higher density compared to the zeolite Y particles permits them to be separated by a variety of arrangements, two of which are shown in FIGS. 1 and 2.

Referring to FIG. 1, there is shown a riser reactor 10 provided with a mixture of $C_3$ and $C_4$ paraffins introduced into lower region 11 through conduit 13. The feed combines with stripped catalyst transferred directly from the lower region of catalyst bed 22 located within the stripping zone to the bottom of riser 10 through conduit 80 provided with flow control valve 81. The stripped catalyst contains a relatively high proportion of ZSM-5 particles. The conversion conditions within lower section 11 of riser 10 can be varied depending upon whether it is desired to maximize production of aromatics and hydrogen or less aromatics and hydrogen but higher light olefins (for a higher overall liquid yield). When it is desired to emphasize the production of aromatics, the ZSM-5 zeolite of the second catalyst component can represent from about 0.01 to about 40, and preferably from about 1 to about 10, weight percent of the total catalyst mixture in this section and the temperature can range from about 1100° to about 1500° F. and preferably from about 1250° to about 1350° F., the catalyst to feed ratio can range from about 50:1 to about 200:1 and preferably from about 100:1 to about 150:1 and the catalyst contact time can range from about 10 to about 50 seconds and preferably from about 15 to about 35 seconds. When, however, light olefin production (at the expense of naphtha) is desired, the conditions of ZSM-5 catalyst concentration, temperature, catalyst to feed ratio and/or catalyst contact time can be less severe than the aforementioned ranges.

A heavy hydrocarbon feed, e.g., a gas oil and/or resid, is introduced further up riser 10 in section 12 thereof through conduit 15 and combines with the ascending catalyst-hydrocarbon vapor suspension from lower section 11. The transfer of varying amounts of hot, regenerated zeolite Y from the regenerating zone through conduit 60 provided with flow control valve 61 permits regulation of the zeolite Y concentration in upper section 12 of the riser and assists in maintaining control of the temperature therein. Zeolite Y concentration can range from about 2 to about 50, preferably from about 5 to about 40, weight percent, the temperature can range from about 900° to about 1150° F. and preferably from about 925° to about 1000° F., the catalyst to heavy hydrocarbon feed ratio can range from about 3:1 to about 20:1 and preferably from about 4:1 to about 10:1 and the catalyst contact time can range from about 0.5 to about 30 seconds and preferably from about 1 to about 15 seconds. During passage of the suspension through the upper section of the riser, conversion of the heavy hydrocarbon feed to lower and higher boiling products occurs. The catalyst-hydrocarbon suspension ultimately passes to cyclone separator 14 which separates catalyst particles from gases, the former entering catalyst bed 22 via dipleg 20 and the latter entering plenum chamber 16 for transfer through conduit 18 to a downstream product separation facility (not shown). Vessel 26 which occupies an approximately central region of the stripping zone is provided with a source of stripping gas, e.g., steam, supplied through conduit 27 in the lower section thereof. The particles of ZSM-5 catalyst, being of greater average density than the zeolite Y particles, tend to gravitate toward and concentrate at the bottom of vessel 26 and, following stripping, to enter return conduit 80 for return to riser 10. Meanwhile, the ascending current of stripping gas and desorbed hydrocarbonaceous material acts as a lift medium tending to carry lower density particles of zeolite Y out of vessel 26 into an outer peripheral region 40 the lower section of which is provided with its own supply of stripping gas, again, e.g., steam, through conduit 41. Stripping gas and other gasiform material is separated from catalyst particles in cyclone separator 53, the former passing to plenum chamber 16 and the latter entering catalyst bed 22 via dipleg 54. Stripped, spent zeolite Y continues its downward flow movement and is withdrawn from the stripper where it is conveyed to the regenerating zone as represented by regenerator unit 46.

In order to enhance the overall efficiency of the operation, a light olefin feed, e.g., a gas rich in ethylene and/or propylene, can be introduced into catalyst bed 22 in the lower region thereof through conduit 50 to produce higher molecular weight aromatic products which improve the absorption efficiency of the stripping operation. In general, the quantity of light olefin feed should be such as to increase the temperature of the catalyst bed in this region by at least about 50° F., and preferably by at least about 100° F. To accomplish this, from about 0.5 to about 20, and preferably from about 1 to about 10, weight percent of light olefin feed can be introduced into this phase by weight of total catalyst present in the stripper.

Ordinarily, then, the temperature of catalyst bed 22 will increase from its usual range of about 880°-1150° F. to about 930°-1250° F. and even higher. This increase in spent catalyst bed temperature significantly enhances the stripping, or desorption, of hydrocarbons and, where present, sulfur compounds, which are entrained by the catalyst particles. It is possible to increase the recovery of such entrained hydrocarbons by from about 5 to about 30 weight percent or more compared to substantially the same stripping procedure carried out in the absence of the exothermic conversion reaction herein. Optionally, where the light olefin feed in line 50 is predominantly made up of ethylene, one or more other highly reactive light olefins, e.g., propylene, butylene or mixtures thereof, can be introduced into the lower region of catalyst bed 22 through a separate conduit 51 in order to take advantage of the higher partial pressure of the ethylene contained in the feed stream introduced through line 50 located therebelow. Amounts of $C_3$ and/or $C_4$ olefin material ranging from about 0.1 to about 5, and preferably from about 0.2 to about 3, weight percent of the entire catalyst bed can be suitably employed.

Spent zeolite Y particles attain a relatively high level of hydrocarbonaceous material which is subsequently removed therefrom by regeneration with oxygen-containing regeneration gases. The stripped catalyst particles are passed by conduit 36 provided with flow control valve 38 to catalyst regeneration unit 46 containing a dense fluid bed of catalyst 48. Regeneration gas such as air is introduced to the lower portion of regenerator 46 by air distributor 150 supplied by conduit 52. Cyclone separators 154 provided with diplegs 56 separates entrained catalyst particles from flue gases and return the separated catalyst to the fluid bed of catalyst. Flue gases pass from the cyclones into a plenum chamber and are removed therefrom by conduit 58. Hot regenerated zeolite Y catalyst is returned to the bottom of riser 10 by conduit 60 with flow control value 61 as discussed above to participate in another cycle of conversion.

It is advantageous to utilize hydrogen recovered from the foregoing cracking operation in the hydrotreating of the gas oil/resid charge stock, especially where the latter contains fairly high quantities of metal contaminants and/or sulfur-containing material. Thus, hydrogen recovered from a gas plant operation is conveyed to a hydrotreating unit supplied with a gas oil/resid feed and operated in accordance with conventional or otherwise known conditions in the presence of suitable hydrotreating catalysts, e.g., cobalt and molybdenum oxides on alumina, nickel oxide, nickel thiomolybdate, tungsten and nickel sulfides and vanadium oxide. Process variables include a temperature of from about 600° to about 800° F., a pressure of from about 100 to about 3,000 psig, about 2,000 scf/bbl hydrogen and a space velocity (LHSV) of from about 0.5 to about 8.0. The hydrotreated gas/oil resid at elevated temperature is conveyed through conduit 13 to riser 10 as previously described.

The embodiment of the process shown in FIG. 2 is essentially like that described in connection with FIG. 1 except for the manner in which the comparatively denser particles of ZSM-5 are separated from the zeolite Y particles in the stripping zone. Descending catalyst bed 22 situated within an outer region of the stripping zone encounters streams of stripping gas, e.g., steam, introduced through conduits 27 and 28 which tends to lift the less dense particles of zeolite Y up concentrically arranged vertical conduits 160 and 161, respectively. The more dense particles of ZSM-5 catalyst continue to flow downwardly where they eventually enter return conduit 80 for return to riser 10. The source of stripping gas is advantageously placed below perforated baffles 67 so that the gas tends to force the less dense zeolite Y particles against baffles 68, the latter guiding the flow of the zeolite Y particles up conduits 160 and 161. The upper section of conduits 160 and 161 lead to one or more cyclone separators 70 and 71 which convey the separated spent zeolite Y particles through conduits 72 and 73 to the regenerator (not shown).

From the aforedescribed preferred embodiments of the process herein, it will be appreciated that due to the separation of ZSM-5 particles from zeolite Y particles in the stripper together with the comparatively prolonged residency time of ZSM-5 particles in the lower section of the riser, it is possible to have much of the ZSM-5 catalyst particles bypass the regenerator altogether. As a result, the ZSM-5 catalyst particles can be retained in the catalyst inventory at their initial level of activity therein for a longer average period of time than would be the case were the circulation rate of the ZSM-5 particles the same as or similar to that of the zeolite Y catalyst particles.

Having thus provided a general discussion of the present invention and described specific embodiments in support thereof, it is to be understood that no undue restrictions are to be imposed by reason thereof except as provided by the following claims.

What is claimed is:

1. A catalytic cracking process undertaken in a system including a single riser reaction zone having a lower and an upper section wherein hydrocarbon conversion reactions take place, a stripping zone in which entrained hydrocarbon material is removed from catalyst and a regeneration zone in which spent cracking catalyst is regenerated, wherein the catalyst comprises a first component and a second component of a mixed catalyst system which process comprises:
   (a) cracking a $C_3$–$C_4$ paraffin-rich feed in the lower section of the riser reaction zone in the presence of the second component of a mixed catalyst system, the second component being selected from the group consisting of zeolite Beta, a shape selective medium pore crystalline silicate zeolite or admixtures thereof, to provide conversion products comprising light olefins including aromatics and hydrogen; wherein said light olefins comprise propylene and butylene and
   (b) cracking a heavy hydrocarbon feed which is selected from the group consisting of a gas oil; a resid in an upper section of the riser reaction zone in the presence of the first component of the mixed catalyst system, the first component comprising at least one catalyst selected from the group consisting of an amorphous cracking catalyst and a large pore crystalline cracking catalyst, to provide gasoline boiling range components, there being at least one difference between at least one physical characteristic of the first component and of the second component of the mixed catalyst system to permit particles of second catalyst component to remain in the lower section of the riser reaction zone for a longer average period of time than particles of first catalyst component said at least one physical characteristic selected from the group consisting of particle size and density.

2. The process of claim 1 wherein in step (a), a mixture of $C_3$ and $C_4$ paraffins is cracked.

3. The process of claim 1 wherein the first catalyst component is a large pore crystalline silicate zeolite.

4. The process of claim 1 wherein the first catalyst component is a large pore crystalline silicate zeolite selected from the group consisting of zeolite X, Y, REY, USY, RE-USY, mordenite and mixtures thereof and the second catalyst component is selected from the group consisting of zeolite Beta, ZSM-5, ZSM-11 ZSM-12, ZSM-23, ZSM-35, ZSM-38 and ZSM-48.

5. The process of claim 4 wherein the second catalyst component contains at least one element selected from the group consisting of boron, gallium, zirconium and titanium.

6. The process of claim 1 wherein cracking step (a) is carried out at a zeolite concentration of second catalyst component of from about 1 to about 10 weight percent of the total catalyst present in the lower section of the riser reaction zone, the temperature is within the range of from about 1250° to about 1350° F., the catalyst to feed ratio is within the range of from about 100:1 to about 150:1 and the catalyst contact time is within the range of from about 15 to about 35 seconds.

7. The process of claim 1 wherein cracking step (b) is carried out at a zeolite concentration of first catalyst component of from about 2 to about 50 weight percent of the total catalyst present in the upper section of the riser reaction zone, the temperature is within the range of from about 900 to about 1150° F., the catalyst to feed ratio is within the range of from about 3:1 to about 20:1 and the catalyst contact time is within the range of from about 0.5 to about 30 seconds.

8. The process of claim 1 wherein cracking step (b) is carried out at a zeolite concentration of first catalyst component of from about 5 to about 40 weight percent of the total catalyst present in the upper section of the riser reaction zone, the temperature is within the range of from about 925° to about 1000° F., the catalyst to feed ratio is within the range of from about 4:1 to about 10:1 and the catalyst contact time is within the range of from 1 to about 15 seconds.

9. The process of claim 5 wherein cracking step (a) is carried out a zeolite concentration of second catalyst component of from about 0.01 to about 40 weight percent of the total catalyst present in the lower section of the riser reaction zone, the temperature is within the range of from about 1100° to about 1500° F., the catalyst to feed ratio is within the range of from about 50:1 to about 200:1 and the catalyst contact time is within the range of from about 10 to about 50 seconds and cracking step (b) is carried out at a zeolite concentration of first catalyst component of from about 2 to about 50 weight percent of the total catalyst present in the upper section of the riser reaction zone, the temperature is within the range of from about 900° to about 1150° F., the catalyst to feed ratio is within the range of from about 3:1 to about 20:1 and the catalyst contact time is within the range of from about 0.5 to about 30 seconds.

10. The process of claim 4 wherein cracking step (a) is carried out at a zeolite concentration of second catalyst component of from about 1 to about 10 weight percent of the total catalyst present in the lower section of the riser reaction zone, the temperature is within the range of from about 1250° to about 1350° F., the catalyst to feed ratio is within the range of from about 100:1 to about 150:1 and the catalyst contact time is within the range of from about 15 to about 35 seconds and cracking step (b) is carried out at a zeolite concentration of first catalyst component of from about 5 to about 40 weight percent of the total catalyst present in the upper section of the riser reaction zone, the temperature is within the range of from about 925° to about 1000° F., the catalyst to feed ratio is within the range of from about 4:1 to about 10:1 and the catalyst contact time is within the range of from about 1 to about 15 seconds.

11. The process of claim 1 wherein the average particle size of the first catalyst component ranges from about 20 to about 150 microns and the average particle size of the second catalyst component ranges from about 500 to about 70,000 microns, and/or the average packed density of the first catalyst component ranges from about 0.4 to about 1.1 gm/cm$^3$ and the average packed density of the second catalyst component ranges from about 0.6 to about 4.0 gm/cm$^3$.

12. The process of claim 1 wherein the second catalyst component is composited with a matrix material which imparts a greater density to said component compared to the density of the first catalyst component.

13. The process of claim 1 wherein the second catalyst component is composited with a matrix material which possesses a coking rate which is higher than the coking rate of the first catalyst component.

14. The process of claim 1 wherein the difference between the average particle densities of the first and second catalyst component are such as to permit their separation within the stripping zone with a counter-current stream of lift medium which separates catalyst component of lesser average particle density from the remainder of descending catalyst particles carrying the former into a separate region of the stripping zone.

15. The process of claim 14 wherein the counter-current stream of lift medium separates catalyst component of lesser average particle density from the remainder of the descending catalyst particles contains within the central region of the stripping zone and carries the former into a separate peripheral region of the stripping zone.

16. The process of claim 15 wherein the lift medium is steam.

17. The process of claim 15 wherein the average particle density of the second catalyst component is greater than that of the first catalyst component.

18. The process of claim 14 wherein the counter-current stream of lift medium separates catalyst component of lesser average particle density from the remainder of the descending catalyst particles contained within an outer region of the stripping zone and carries the former into a separate central region of the stripping zone.

19. The process of claim 18 wherein the lift medium is steam.

20. The process of claim 18 wherein the average particle density of the second catalyst component is greater than that of the first catalyst component.

21. The process of claim 14 wherein aromatics are produced in the zone where the second catalyst component is stripped.

22. The process of claim 1 wherein the heavy hydrocarbon feed material is subjected to hydrotreatment prior to its introduction to the riser.

23. The process of claim 22 wherein the hydrotreatment utilizes hydrogen recovered from the catalytic cracking process.

24. The process of claim 1 wherein the lower section of the riser is outwardly flared so as to decrease the linear velocity of the fluid stream in said lower section, said decreased linear velocity further prolonging the residency of the second catalyst component in said lower section.

* * * * *

UNITED STATES PATENT AND TRADEMARK OFFICE
CERTIFICATE OF CORRECTION

PATENT NO. : 4,752,375

DATED : June 21, 1988

INVENTOR(S) : Joseph A. Herbst et al

It is certified that error appears in the above-identified patent and that said Letters Patent is hereby corrected as shown below:

Column 11, line 46, delete "molecular" and "aromatic".

Column 13, line 37, after "olefins" insert --,--; delete the word "including".

Column 13, line 39, after "butylene" insert --;--.

Column 13, line 41, delete ";" and insert --and--.

Signed and Sealed this

Twenty-fourth Day of January, 1989

Attest:

DONALD J. QUIGG

Attesting Officer

Commissioner of Patents and Trademarks